Patented June 26, 1945

2,379,223

UNITED STATES PATENT OFFICE 2,379,223

INSECTICIDES

Theodore W. Evans, Oakland, and Paul H. Williams, Berkeley, Calif., assignors to Shell Development Company, San Francisco, Calif., a corporation of Delaware No Drawing. Application June 30, 1942, Serial No. 449,168

9 Claims. (Cl. 167—24)

This invention deals with a new insecticide of great utility, and is particularly concerned with toxic substances suitable for use in household insecticides and de-lousing powders. Among the best known and most useful toxicants for such purposes at present are pyrethrum and rotenone. These are both derived from plants grown in foreign countries and are therefore expensive and not always obtainable in desired quantities.

It is an object of the present invention to provide an insecticide which can be readily manufactured from readily available domestic, inexpensive materials. It is a further object of this invention to provide a very toxic, moderately fast acting insecticide which is little if at all toxic to man and other warm-blooded animals. Another object is to provide a synthetic toxicant which is stable toward sunlight and which is compatible with plant toxics. Other and further objects will be apparent from reading the specification.

It has been found that amides produced by reacting di-allyl amines with aliphatic carboxylic acids may be utilized as insecticides to accomplish one or more of the foregoing objects.

The di-allyl amines which are used to produce the di-allyl amides of the invention are preferably unsubstituted di-allyl amines. However, one or both of the allyl groups may contain beta alkyl substitution, of 1 to 4 carbon atoms, such as in dimethallyl amide of undecylenic acid.

The aliphatic carboxylic acids which are employed to produce the di-allyl amides should contain about 9 to 18 carbon atoms, although acids containing a greater and lesser number of carbon atoms are included within the scope of the invention. The hydrocarbon radical of the acid may be saturated, unsaturated, straight, branched, or a mixed-chain radical. The amides produced by reacting the di-allyl amines with undecylenic acid have proved unusually effective.

An example of the production of a suitable amide follows:

To an ice-cooled benzene solution containing 48.5 grams (.5 mols) of di-allyl amine was added 50 grams (.25 mols) of undecylenic acid chloride, prepared by reacting undecylenic acid and phosphorus pentachloride. The temperature was maintained below 10° C. during the addition of the acid chloride, and the mixture was shaken and cooled for ½ hour after the final addition. The product mixture was then washed with dilute hydrochloric acid and with water. The remaining benzene solution was then distilled and 64 grams, or 97% yield, based on acid chloride, of product distilling without decomposition at 174° C. to 176° C. at about 1 mm. pressure was obtained.

The di-allyl amide so obtained was utilized as a toxic in a mineral oil fly spray both with and without the addition of pyrethrum. Its killing power proved to be more than twice that of the most effective amide described in the literature.

A few drops of a solution of N,N-diallylundecyleneamide in odorless base kerosene was placed on filter paper and exposed to strong sunlight and air. The liquid evaporated leaving substantially no stain behind. This property is important in household insecticides and the like where absence of stain is highly desirable.

The insecticide of the instant invention may be applied to plants and animals in a variety of ways. For use in household insecticides the compounds may be dissolved in a light hydrocarbon oil such as kerosene or kerosene distillate with or without the addition of other insecticides and sprays. Ordinarily from about .2%–25% of the toxicants are used in such sprays.

For use on plants the acid amides may be dissolved in a plant spray oil and emulsified in water to produce sprayable emulsions. The common emulsifying agents such as glycerol mono-oleate, sulfated and sulfonated fatty and mineral oils, soaps and the like, may be used in combination with such sprays. In the same manner, the acid amides themselves without the addition of oil may be emulsified and used as plant spray insecticides.

The amides of our invention may also be adsorbed on finely divided materials such as wood fiber, talc, clay, sulfur or carbon black and be used as dusting insecticides or de-lousing agents.

We claim as our invention:

1. An insecticidal composition comprising a carrier and a di-allyl amide of an aliphatic carboxylic acid of 9 to 18 carbon atoms.

2. An insecticidal composition comprising a carrier and a di-allyl amide of undecylenic acid.

3. An insecticidal composition comprising a carrier and a di-allyl amide of an aliphatic carboxylic acid of 9 to 18 carbon atoms, said compound being further characterized by beta alkyl substitution of 1 to 4 carbon atoms in an allyl radical.

4. An insecticidal composition comprising a carrier and dimethallyl amide of undecylenic acid.

5. A household insecticide comprising an insecticidal hydrocarbon spray oil and a di-allyl amide of an aliphatic carboxylic acid of 9 to 18 carbon atoms.

6. An insecticidal composition comprising pyrethrum and a di-allyl amide of an aliphatic carboxylic acid of 9 to 18 carbon atoms.

7. A plant spray insecticide comprising a plant spray mineral oil, an emulsifying agent, and a di-allyl amide of an aliphatic carboxylic acid of 9 to 18 carbon atoms.

8. A dust insecticidal composition comprising a finely divided absorptive substance and a di-allyl amide of an aliphatic carboxylic acid of 9 to 18 carbon atoms.

9. A de-lousing powder, a toxic ingredient of which comprises a di-allyl amide of an aliphatic carboxylic acid of 9 to 18 carbon atoms.

THEODORE W. EVANS.
PAUL H. WILLIAMS.